(12) United States Patent
Qiu et al.

(10) Patent No.: US 10,952,466 B2
(45) Date of Patent: Mar. 23, 2021

(54) BATTERY ASSEMBLY AND ELECTRONIC CIGARETTE THEREOF

(71) Applicant: Changzhou Patent Electronic Technology Co., LTD, Jiangsu (CN)

(72) Inventors: Weihua Qiu, Jiangsu (CN); Dingding Zou, Jiangsu (CN)

(73) Assignee: Changzhou Patent Electronic Technology Co., LTD, Jiangsu (CN)

( * ) Notice: Subject to any disclaimer, the term of this patent is extended or adjusted under 35 U.S.C. 154(b) by 344 days.

(21) Appl. No.: 16/106,825

(22) Filed: Aug. 21, 2018

(65) Prior Publication Data

US 2019/0067666 A1 Feb. 28, 2019

(30) Foreign Application Priority Data

Aug. 30, 2017 (CN) .......................... 201721105218.9

(51) Int. Cl.
| *A24F 40/40* | (2020.01) |
| *H01M 2/26* | (2006.01) |
| *A24F 47/00* | (2020.01) |
| *H01M 2/10* | (2006.01) |
| *H01M 10/46* | (2006.01) |
| *H01M 10/04* | (2006.01) |

(52) U.S. Cl.
CPC ............ *A24F 40/40* (2020.01); *A24F 47/008* (2013.01); *H01M 2/1055* (2013.01); *H01M 2/26* (2013.01); *H01M 10/0436* (2013.01); *H01M 10/46* (2013.01); *H01M 2220/30* (2013.01)

(58) Field of Classification Search
None
See application file for complete search history.

(56) References Cited

U.S. PATENT DOCUMENTS

| 9,888,726 | B2* | 2/2018 | Liu | ..................... H01M 2/1055 |
| 9,894,932 | B2* | 2/2018 | Liu | .......................... H05B 1/02 |
| 9,894,933 | B2* | 2/2018 | Li | .......................... H01H 19/36 |
| 9,901,116 | B2* | 2/2018 | Liu | ...................... A24F 47/008 |
| 9,955,728 | B2* | 5/2018 | Liu | ...................... A24F 47/008 |
| 10,004,261 | B2* | 6/2018 | Li | ........................ A61M 11/042 |
| 10,582,725 | B2* | 3/2020 | Li | .......................... A24F 40/40 |
| 2015/0020827 | A1* | 1/2015 | Liu | ...................... A24F 47/008 |
| 2015/0034107 | A1* | 2/2015 | Liu | ...................... A24F 47/008 131/329 |

(Continued)

*Primary Examiner* — James Harvey
(74) *Attorney, Agent, or Firm* — Novick, Kim & Lee, PLLC; Allen Xue

(57) ABSTRACT

A battery assembly and an electronic cigarette are provided. The battery assembly includes a housing, a battery cell located in the housing, a upper mounting seat slidably disposed on the housing, an elastic member and an electrode contact are located within the housing, and the housing is provided with an atomizer interface, the electrode contact is disposed on the upper mounting seat, the electrode contact and the upper mounting seat are disposed between the atomizer interface and the battery cell, and the elastic member elastically resists the upper portion a mounting seat, the electrode contact is separated from the positive electrode or the negative electrode of the battery cell by an elastic force of the elastic member, and the electrode contact contacts with the positive electrode or the negative electrode of the battery cell by overcome the elastic force of the elastic member under an external force.

18 Claims, 4 Drawing Sheets

(56) References Cited

U.S. PATENT DOCUMENTS

| 2019/0067666 A1* | 2/2019 | Qiu | H01M 10/0436 |
| 2019/0239565 A1* | 8/2019 | Qiu | H01H 13/14 |
| 2020/0321567 A1* | 10/2020 | Liu | H01M 2/105 |

* cited by examiner

BATTERY ASSEMBLY AND ELECTRONIC CIGARETTE THEREOF

CROSS-REFERENCE TO RELATED APPLICATIONS

The application claims benefit of Chinese Patent Application Serial Number 201721105218.9, filed on Aug. 30, 2017, entitled "battery assembly and electronic cigarette thereof," which is incorporated herein by reference in its entirety.

FIELD

The present disclosure relates to the field of simulated smoking technology, and more particularly to a battery assembly and an electronic cigarette using the same.

BACKGROUND

At present, the battery assembly of most electronic cigarettes on the market adopt a housing as a negative electrode, and a positive electrode contact is arranged in the housing, the positive electrode contact and the housing is insulated from each other by an insulation member disposed therebetween. The positive electrode contact of such type of electronic cigarette is always connected to the positive electrode of the battery, and the positive electrode contact is exposed outside the battery assembly to wait for connection with the electrode end on the atomizer.

However, when the battery assembly is not connected to the atomizer, the positive electrode contact and the housing are easy to conduct as long as the conductive medium falling into the housing or/and positive electrode contact, and there is a danger of battery discharge.

SUMMARY

The present disclosure provides a battery assembly and an electronic cigarette thereof. The battery assembly has high safety protection and can reduce the risk of the battery cell being discharged due to non-human operation.

In one embodiment of the present disclosure, a battery assembly includes a housing, a battery cell located in the housing; and an upper mounting seat slidably disposed on the housing, an elastic member and an electrode contact are located within the housing, and the housing is provided with an atomizer interface, the electrode contact is disposed on the upper mounting seat, the electrode contact and the upper mounting seat are disposed between the atomizer interface and the battery cell, and the elastic member elastically resists the upper portion a mounting seat, the electrode contact is separated from the positive electrode or the negative electrode of the battery cell by an elastic force of the elastic member, and the electrode contact contacts with the positive electrode or the negative electrode of the battery cell by overcome the elastic force of the elastic member under an external force.

In a further embodiment of the current disclosure, the battery assembly further includes a lower mounting seat, the upper mounting seat, the lower mounting seat and the battery cell are arranged in the housing in sequence from top to bottom along an axial direction of the housing, the elastic member is disposed between the upper mounting seat and the mounting seat.

In still another embodiment, the upper mounting seat is provided with an upper slot, the upper slot is disposed at the lower end surface of the upper mounting seat, the upper end of the elastic member is embedded in the upper slot, the lower end of the elastic member is disposed in the lower slot.

In still a further embodiment, the lower end of the upper mounting seat is provided with a first protrusion, the lower mounting seat is provided with an opening corresponding to the first protrusion, the first projection cooperates with the opening to guide the upper mounting seat to slide in a direction adjacent the positive pole or negative pole of the battery cell.

In certain embodiments, the electrode contact includes an upper contact and a lower contact, the first protrusion is provided with an electrode hole, the lower contact is provided with a contact hole, the lower contact is inserted into the electrode hole from the lower end of the upper mounting seat, the upper contact is inserted into the contact hole from the upper end of the upper mounting seat.

In other embodiments, the housing includes a first shell, a second shell and a connecting member, the connecting member is connected to the upper end of the first shell, the second shell is sleeved on the connecting member, the atomizer interface is disposed on the second shell.

In still other embodiments, a second protrusion is protruded on the inner wall of the second shell, the second protrusion is hollow to form an inner cavity extending through the opposite ends of the second protrusion, the inner cavity forms the atomization interface.

In some further embodiments, the upper end of the upper mounting seat is provided with a groove corresponding to the second protrusion, the second protrusion cooperates with the groove to guide the upper mounting seat to slide along the direction away from the positive or negative electrode of the battery cell.

In still further embodiments, the elastic member is a ring-shaped wave spring.

In one further embodiment of the current disclosure, an electronic cigarette includes a battery assembly; and an atomizer, the battery assembly includes a housing, a battery cell located in the housing, and a upper mounting seat slidably disposed on the housing, an elastic member and an electrode contact are located within the housing, the housing is provided with an atomizer interface, the electrode contact is disposed on the upper mounting seat, the electrode contact and the upper mounting seat are disposed between the atomizer interface and the battery cell, and the elastic member elastically resists the upper portion a mounting seat, the electrode contact is separated from the positive electrode or the negative electrode of the battery cell by an elastic force of the elastic member, and the electrode contact contacts with the positive electrode or the negative electrode of the battery cell by overcome the elastic force of the elastic member under an external force.

In certain embodiments, the battery assembly further includes a lower mounting seat, the upper mounting seat, the lower mounting seat and the battery cell are arranged in the housing in sequence from top to bottom along an axial direction of the housing, the elastic member is disposed between the upper mounting seat and the mounting seat.

In further embodiments, the upper mounting seat is provided with an upper slot, the upper slot is disposed at the lower end surface of the upper mounting seat, the upper end of the elastic member is embedded in the upper slot, the lower end of the elastic member is disposed in the lower slot.

In still further embodiments, the lower end of the upper mounting seat is provided with a first protrusion, the lower mounting seat is provided with an opening corresponding to the first protrusion, the first projection cooperates with the opening to guide the upper mounting seat to slide in a direction adjacent the positive pole or negative pole of the battery cell.

In one aspect of certain embodiments, the electrode contact includes an upper contact and a lower contact, the first protrusion is provided with an electrode hole, the lower contact is provided with a contact hole, the lower contact is inserted into the electrode hole from the lower end of the upper mounting seat, the upper contact is inserted into the contact hole from the upper end of the upper mounting seat.

In another aspect of certain embodiments, the housing includes a first shell, a second shell and a connecting member, the connecting member is connected to the upper end of the first shell, the second shell is sleeved on the connecting member, the atomizer interface is disposed on the second shell.

In still another aspect, a second protrusion is protruded on the inner wall of the second shell, the second protrusion is hollow to form an inner cavity extending through the opposite ends of the second protrusion, the inner cavity forms the atomization interface.

In a further aspect of certain embodiments, the upper end of the upper mounting seat is provided with a groove corresponding to the second protrusion, the second protrusion cooperates with the groove to guide the upper mounting seat to slide along the direction away from the positive or negative electrode of the battery cell.

In still one more aspect, the elastic member is a ring-shaped wave spring.

The beneficial effects of the utility model are:

The electrode contact and the upper mounting seat are matched to isolate the channel between the atomizer interface and the battery cell, therefore, the foreign matter with the conductive medium is more difficult to enter the inner cavity of the housing through the atomizer interface and then contacts the positive/negative electrode of the battery cell. Further, it is necessary to overcome the elastic force of the elastic member so that the electrode contact can be moved to contact the positive/negative electrode of the battery cell. Based on the above, the battery assembly provided by the present disclosure has high safety protection and can reduce the risk of the battery being discharged due to non-human operation.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

Figure 1:
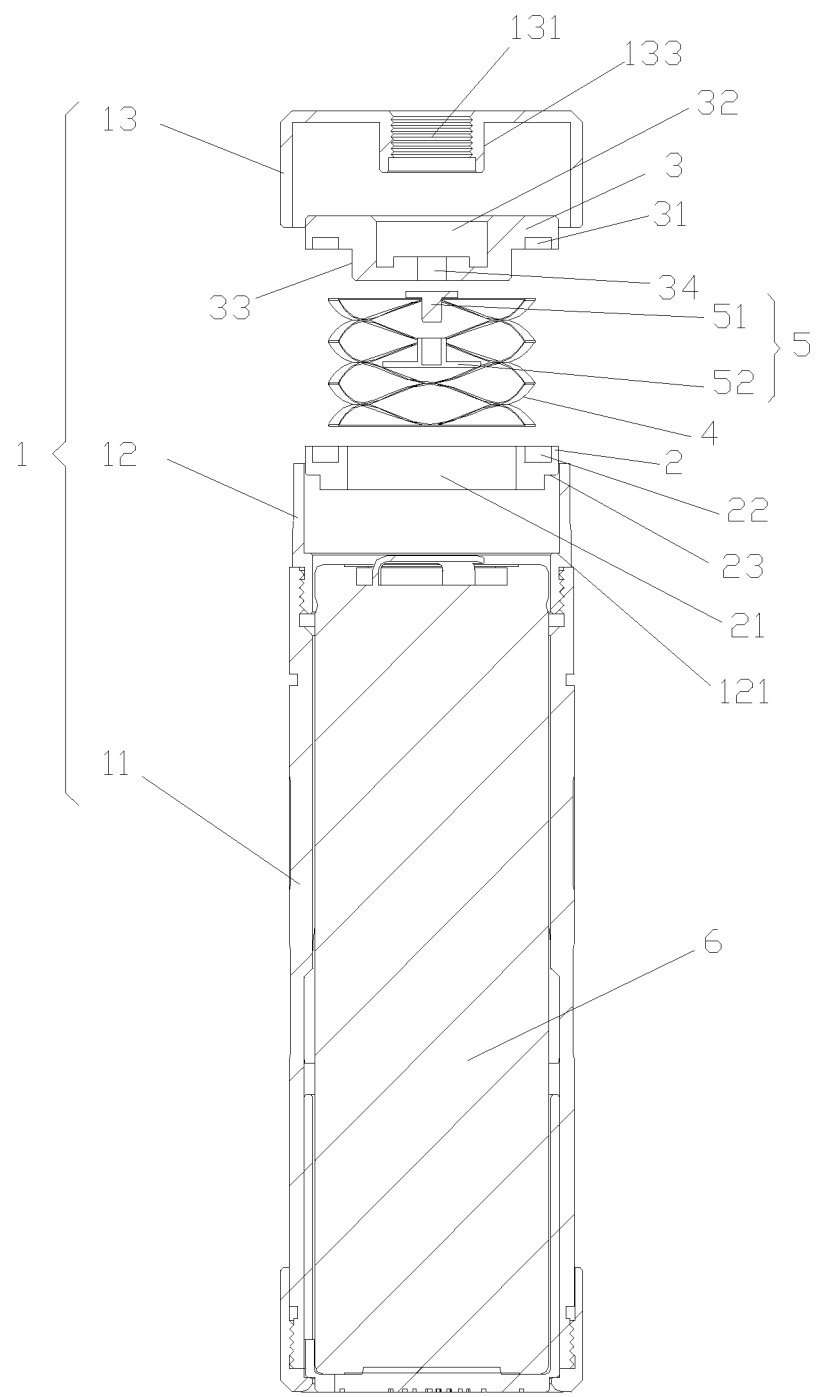
FIG. 1 is isometric view of a battery assembly according to an embodiment of the present application.

The following table list various components and reference numerals thereof.

| 1 | housing |
| 2 | lower mounting seat |
| 3 | upper mounting seat |
| 4 | elastic member |
| 5 | electrode contact |
| 6 | battery cell |
| 11 | first shell |
| 12 | connecting member |
| 13 | second shell |
| 21 | opening |
| 22 | lower slot |
| 23 | second abutting portion |
| 31 | upper slot |
| 32 | groove |
| 33 | first protrusion |
| 34 | electrode hole |
| 51 | upper contact |
| 52 | lower contact |
| 121 | first abutting portion |
| 131 | atomizer interface |
| 133 | second protrusion |
| 511 | upper abutting portion |
| 521 | lower abutting portion |
| 522 | contact hole |

DETAILED DESCRIPTION OF PREFERRED EMBODIMENTS

The specific embodiments of the present disclosure will be described in detail below with reference to the accompanying drawings. It should be understood that the specific embodiments described herein are only used to illustrate and explain the present disclosure and are not intended to limit the present disclosure.

Figure 2:
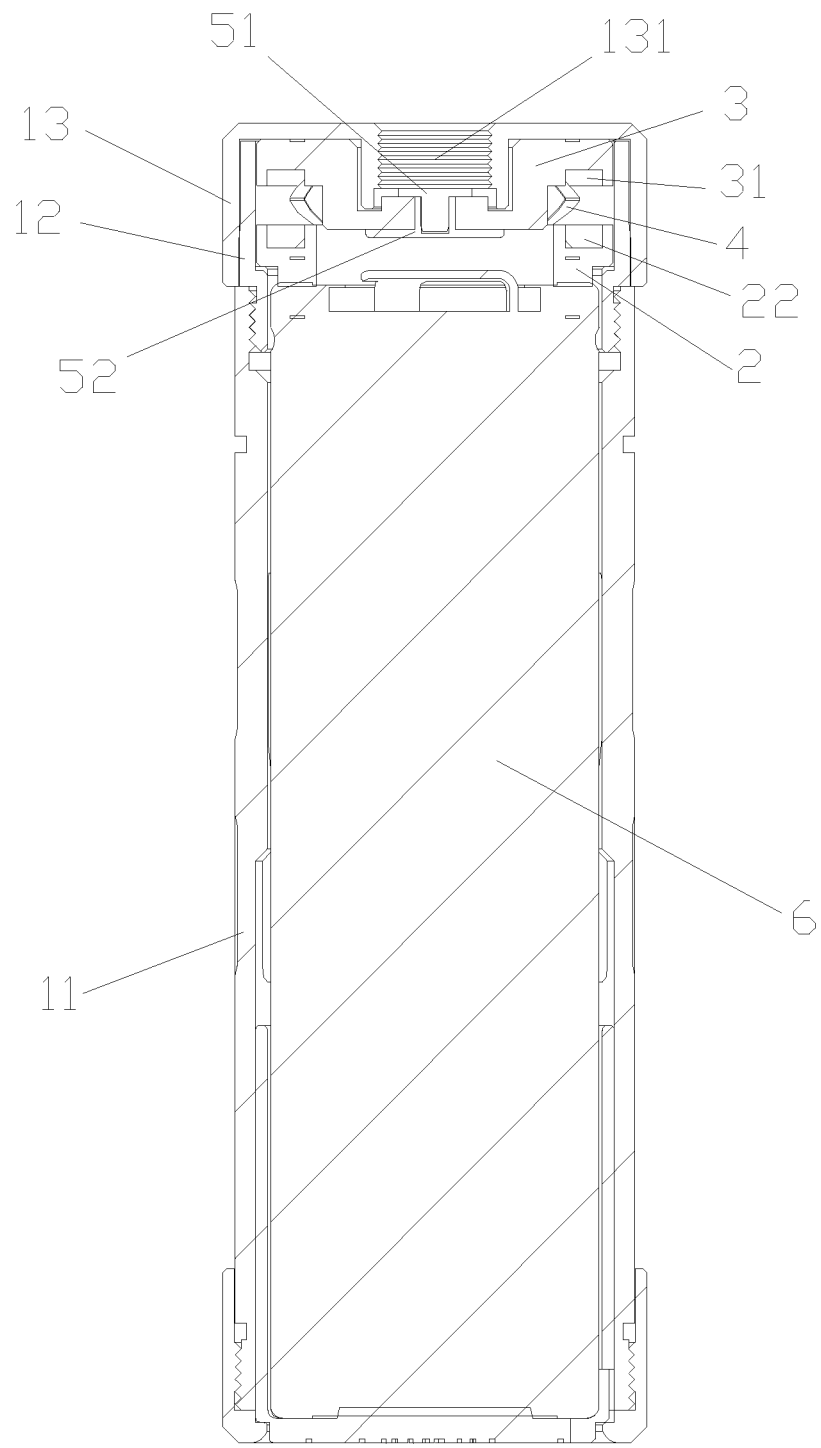
FIG. 2 is a cross-sectional view of the battery assembly of FIG. 1.

Referring to FIG. 1 and FIG. 2, an embodiment of the present disclosure discloses a battery assembly. The battery assembly includes a housing 1. A battery cell 6, an upper mounting seat 3, and a lower mounting seat 2, an elastic member 4 and an electrode contact 5 are located in the housing 1.

Specifically, the upper end of the housing 1 is provided with an atomizer interface 131, the upper mounting seat 3, the lower mounting seat 2 and the battery cell 6 are disposed in the housing 1 from top to bottom in the axial direction of the housing 1. The elastic member 4 is located between the lower mounting seat 2 and the upper mounting seat 3. The electrode contact 5 is positioned on the upper mounting seat 3. The electrode contact 5 cooperates with the upper mounting seat 3 to isolate the passage between the atomizer interface 131 and the battery cell 6, and the electrode contact 5 is separated from the positive electrode of the battery cell 6 by the elastic force of the elastic member 4.

Since the passage between the atomizer interface 131 and the battery cell 6 is isolated by the cooperating between the electrode contact 5 and the upper mounting seat 3, foreign matter with a conductive medium is difficult to pass through the atomizer interface 131 and then enter into the inner cavity of the housing 1 to contact with the positive electrode of the battery cell 6.

Therefore, in order to make the electrode contact 5 electrically connected to the positive electrode of the battery cell 6, it must overcome the elastic force of the elastic member 4 to make the electrode contact 5 moving towards to and then to contact the positive electrode of the battery cell 6.

Based on the above, the battery assembly provided by the present discourse with high safety protection and can reduce the risk of the battery cell 6 being discharged due to non-human operation by outside or errors during operation.

It can be appreciated that, in other embodiments not shown, the negative electrode of the battery cell 6 instead of the positive electrode of the battery cell 6 is corresponding to the electrode contact 5, to achieve electrical conduction between the electrode contact 5 and the battery cell 6.

With continued reference to FIGS. 1 and 2, the housing 1 includes a first shell 11 and a second shell 13, and the second shell 13 is detachably disposed on the first shell 11 by a connecting member 12. Specifically, the connecting member 12 is connected to the upper end of the first shell 11, the second shell 13 is sleeved on of the connecting member 12, and the atomizer interface 131 is disposed on the second shell 13. The first shell 11, the connecting member 12 and the second shell 13 are all made of a conductive material, such as a metal or an alloy. The metal may be iron, and the alloy may be stainless steel or nickel-chromium alloy.

The first shell 11 is a hollow cylinder having an upper opening, and has an internal thread on the inner side of the upper opening thereof. The connecting member 12 is a hollow cylinder with two openings corresponding to each other, and has external thread provided on the outer side of the lower end thereof.

The second shell 13 is a hollow cylinder having a lower opening, the atomizer interface 131 is disposed on the upper end surface of the second shell 13. When assembled, the lower end of the connecting member 12 is inserted into the upper opening of the upper end of the first shell 11 and is coupled to the external thread by the internal thread thereof. The second shell 13 is sleeved on of the connecting member 12 from the upper end of the connecting member 12, the lower end of the second shell 13 abuts against the upper end of the first shell 11.

The atomizer interface 131 is adapted to connect between the atomizer and the battery assembly. The atomizer interface 131 has various design forms. For example, the atomizer interface 131 can be a threaded interface, a card interface, or a docking interface and so on.

The upper mounting seat 3 is slidably disposed on the connecting member 12, the upper mounting seat 3 is provided with an upper slot 31, and the upper slot 31 is disposed at the lower end surface of the upper mounting seat 3. In one embodiment, the upper slot 31 is an annular groove, and the lower end surface of the upper mounting seat 3 further has a first protrusion 33 protruding downward along the axial direction of the upper mounting seat 3. The first protrusion 33 is disposed inside of the upper slot 31, that is, the annular groove is disposed around the first protrusion 33.

To prevent foreign matter with conductive medium from falling into the first shell 11 from the gap between the upper mounting seat 3 and the connecting member 12, the side wall of the upper mounting seat 3 and the inner wall of the connecting member 12 are closely attached. The lower mounting seat 2 is tightly engaged with the connecting member 12, the lower mounting seat 2 is provided with a lower slot 22, and the lower slot 22 corresponding to upper slot 31 is disposed on the upper end surface of the lower mounting seat 2.

When the upper slot 31 is an annular slot, the lower slot 22 is also correspondingly formed as an annular slot; the upper end of the elastic member 4 is embedded in the upper slot 31, the lower end of the elastic member 4 is disposed in the lower slot 22, and the upper mounting seat 3 and the lower mounting seat 2 are separated from each other by the elastic force of the elastic member 4. The middle portion of the lower mounting seat 2 is provided with an opening 21 corresponding to the first protrusion 33, and the first protrusion 33 can be embedded in the opening 21.

When the upper slot 31 and the lower slot 22 are both annular grooves, in one embodiment, the elastic member 4 is a ring-shaped wave spring. The wave spring provides the ideal spring force in a small installation space. The upper mounting seat 3 is made of insulating material, such as rubber or silicone. The lower mounting seat 2 can be made of an insulating material, such as rubber or silicone.

Figure 3:
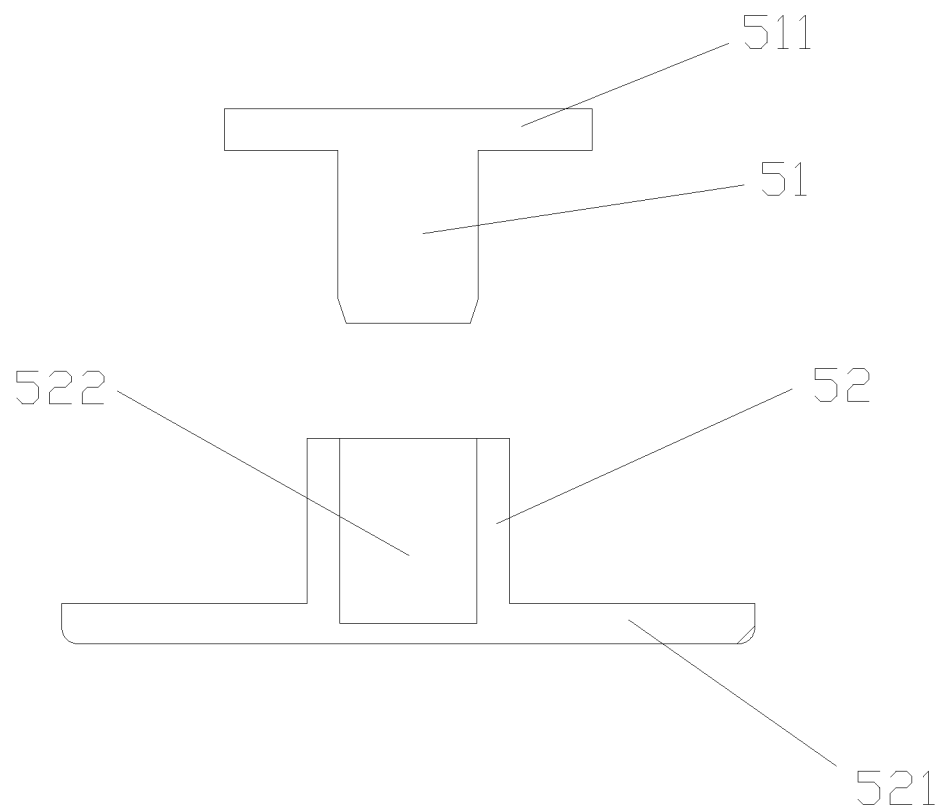
FIG. 3 is an exploded view of the electrode contact in the embodiment of the present application.

Referring to FIG. 1 and FIG. 3, the electrode contact 5 includes an upper contact 51 and a lower contact 52. The first protrusion 33 of the upper mounting seat 3 is provided with an electrode hole 34, and the lower contact 52 is provided with a contact hole 522. The lower contact 52 is inserted into the electrode hole 34 from the lower end of the upper mounting seat 3, the upper contact 51 is inserted into the contact hole 522 from the upper end of the upper mounting seat 3.

The lower contact 52 is tightly fitted to the electrode hole 34, and the upper contact 51 is tightly fitted with the contact hole 522, so that the electrode contact 5 is fixedly disposed on the first protrusion 33. In one embodiment, the upper end of the upper contact 51 is provided with an upper abutting portion 511, and the lower end of the lower contact 52 is provided with a lower abutting portion 521. When the electrode contact 5 is mounted in position, the upper abutting portion 511 shields the upper end of the electrode hole 34, and the lower abutting portion 521 shields the lower end of the electrode hole 34, thereby preventing foreign matter from entering into the inner cavity of the first shell 11 through the electrode hole 34.

A second protrusion 133 is protruded downwardly from the inner wall of the second shell 13 along the axial direction of the second shell 13. The second protrusion 133 is hollow to form an inner cavity extending through the opposite ends of the second protrusion 133, and the inner cavity forms the atomizer interface 131. The upper end of the upper mounting seat 3 is provided with a groove 32 corresponding to the second protrusion 133, the groove 32 communicates with the electrode hole 34. The second protrusion 133 can be inserted into or detached from the groove 32 driven by the upper mounting seat 3.

When the second protrusion 133 is inserted in the groove 32, the electrode contact 5 is separated from the anode of the battery cell 6, and the upper abutting portion 511 shields the atomizer interface 131, to prevent the atomizer interface 131 from communicating with the inside of the battery assembly, thereby preventing foreign matter from falling into the interior of the battery assembly.

Figure 4:
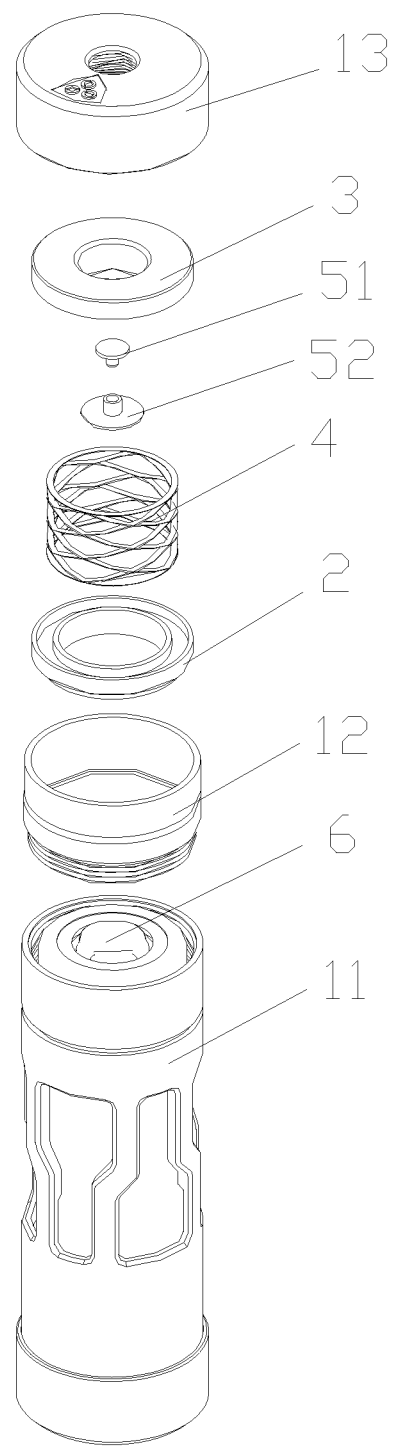
FIG. 4 an exploded view of the battery assembly in the embodiment of the present application.

Referring to FIGS. 1, 2 and 4, when being assembled, the battery cell 6 is inserted into the first shell 11 from the upper opening of the first shell 11 and keeps the positive pole of the battery cell 6 upwards, and then, the connecting member 12 is installed on the first shell 11; The lower mounting seat 2 is inserted into the connecting member 12 from the upper end of the connecting member 12.

In the embodiment, the inner wall of the connecting member 12 is provided with a first abutting portion 121, the bottom portion of the lower mounting seat 2 is provided with a second abutting portion 23 corresponding to the first abutting portion 121. When the second abutting portion 23 abuts against the first abutting portion 121, the lower mounting seat 2 is mounted in place.

The lower end of the elastic member 4 is embedded into the lower slot 22 of the lower mounting seat 2; the upper contact 51 and the lower contact 52 are previously fixed to the upper mounting seat 3, and then the upper mounting seat 3 is covered at the upper end of the elastic member 4, and the upper end of the elastic member 4 is embedded in the upper slot 31 of the upper mounting seat 3.

The upper slot 31 and the lower slot 22 are configured to limit the elastic member 4 that the elastic member 4 is not misaligned on the upper mounting seat 3 and the lower mounting seat 2, and more convenient to install. The second shell 13 is sleeved on the connecting member 12, and the upper mounting seat 3 is covered by the second shell 13.

The second protrusion 133 is embedded in the groove 32 of the upper end of the upper mounting seat 3, thereby ensuring that the upper mounting seat 3 is assembled in position in the second shell 13, such that the upper end of the electrode contact 5 can be conveniently and accurately aligned with the atomizer interface 131.

When the battery assembly is not connected to the atomizer, the upper mounting seat 3 is jacked up by the elastic member 4, thereby the upper mounting seat 3 is spaced apart from the lower mounting seat 2 by a certain distance, and the lower end of the electrode contact 5 is separated from the positive electrode of the battery cell 6, the anode of the battery assembly is not turned on.

The atomizer presses the upper end of the electrode contact 5 to drive the upper mounting seat 3 move downwards until the lower end of the electrode contact 5 abutting against the positive electrode of the battery cell 6, such that the atomizer is installed in place, at this time, the elastic member 4 is in a contracted state. During the downward movement of the upper mounting seat 3, the first protrusion 33 is gradually embedded in the opening 21 for guiding the upper mounting seat 3 to move down to a vertical direction to prevent tilt misalignment. As such, the atomizer is electrically connected to the positive electrode of the battery cell 6 through the electrode contact 5, and is electrically connected to the negative electrode of the battery cell 6 through the housing 1.

It can be appreciated that, in other embodiments not shown, when the negative electrode of the battery cell 6 is disposed corresponding to the electrode contact 5, the atomizer is electrically connected to the negative electrode of the battery cell 6 by the electrode contact 5 and electrically connected to the positive electrode of the battery cell 6 by the housing 1.

The embodiment further discloses an electronic cigarette, the electronic cigarette includes a battery assembly and an atomizer, the battery assembly is a battery assembly as described above, and the lower end of the atomizer is connected to the atomizer interface 131 for installation. The electrode connection end on the atomizer abuts against the electrode contact 5, and is electrically connected to the positive electrode of the battery cell 6 through the electrode contact 5.

In summary, compared with the prior art, the battery assembly provided by the present disclosure has high safety protection, and can reduce the risk of the battery cell 6 being discharged due to non-human operation.

The above-mentioned embodiments merely represent several implementations of the present application, and the descriptions thereof are more specific and detailed, but they shall not be understood as a limitation on the scope of the present application. It should be noted that, for those of ordinary skill in the art, variations and improvements may still be made without departing from the concept of the present application, and all of which shall fall into the protection scope of the present application. Therefore, the scope of protection of the present application shall be subject to the appended claims.

What is claimed is:

1. A battery assembly, comprising:
a housing;
a battery cell located in the housing; and
an upper mounting seat slidably disposed on the housing;
wherein an elastic member and an electrode contact are located within the housing, and the housing is provided with an atomizer interface, the electrode contact is disposed on the upper mounting seat, the electrode contact and the upper mounting seat are disposed between the atomizer interface and the battery cell, and the elastic member elastically resists the upper mounting seat, the electrode contact is separated from the positive electrode or the negative electrode of the battery cell by an elastic force of the elastic member, and the electrode contact contacts with the positive electrode or the negative electrode of the battery cell by overcoming the elastic force of the elastic member under an external force.

2. The battery assembly according to claim 1, wherein the battery assembly further comprises a lower mounting seat, the upper mounting seat, the lower mounting seat and the battery cell are arranged in the housing in sequence from top to bottom along an axial direction of the housing, the elastic member is disposed between the upper mounting seat and the lower mounting seat.

3. The battery assembly according to claim 2, wherein the upper mounting seat is provided with an upper slot, the upper slot is disposed at the lower end surface of the upper mounting seat, the upper end of the elastic member is embedded in the upper slot, the lower end of the elastic member is disposed in a lower slot.

4. The battery assembly according to claim 2, wherein the lower end of the upper mounting seat is provided with a first protrusion, the lower mounting seat is provided with an opening corresponding to the first protrusion, the first protrusion cooperates with the opening to guide the upper mounting seat to slide in a direction adjacent the positive pole or negative pole of the battery cell.

5. The battery assembly according to claim 4, wherein the electrode contact comprises an upper contact and a lower contact, the first protrusion is provided with an electrode hole, the lower contact is provided with a contact hole, the lower contact is inserted into the electrode hole from the lower end of the upper mounting seat, the upper contact is inserted into the contact hole from the upper end of the upper mounting seat.

6. The battery assembly according to claim 1, wherein the housing comprises a first shell, a second shell and a connecting member, the connecting member is connected to the upper end of the first shell, the second shell is sleeved on the connecting member, the atomizer interface is disposed on the second shell.

7. The battery assembly according to claim 6, wherein a second protrusion is protruded on the inner wall of the second shell, the second protrusion is hollow to form an inner cavity extending through the opposite ends of the second protrusion, the inner cavity forms the atomization interface.

8. The battery assembly according to claim 7, wherein the upper end of the upper mounting seat is provided with a groove corresponding to the second protrusion, the second protrusion cooperates with the groove to guide the upper mounting seat to slide along the direction away from the positive or negative electrode of the battery cell.

9. The battery assembly according to claim 1, wherein the elastic member is a ring-shaped wave spring.

10. An electronic cigarette, comprising
a battery assembly; and
an atomizer,
wherein the battery assembly comprises a housing, a battery cell located in the housing, and a upper mounting seat slidably disposed on the housing, an elastic member and an electrode contact are located within the housing, the housing is provided with an atomizer interface, the electrode contact is disposed on the upper mounting seat, the electrode contact and the upper mounting seat are disposed between the atomizer interface and the battery cell, and the elastic member elastically resists the upper mounting seat, the electrode contact is separated from the positive electrode or the negative electrode of the battery cell by an elastic force of the elastic member, and the electrode contact contacts with the positive electrode or the negative electrode of the battery cell by overcoming the elastic force of the elastic member under an external force.

11. The electronic cigarette according to claim 10, wherein the battery assembly further comprises a lower mounting seat, the upper mounting seat, the lower mounting seat and the battery cell are arranged in the housing in sequence from top to bottom along an axial direction of the housing, the elastic member is disposed between the upper mounting seat and the lower mounting seat.

12. The electronic cigarette according to claim 11, wherein the upper mounting seat is provided with an upper slot, the upper slot is disposed at the lower end surface of the upper mounting seat, the upper end of the elastic member is embedded in the upper slot, the lower end of the elastic member is disposed in a lower slot.

13. The electronic cigarette according to claim 11, wherein the lower end of the upper mounting seat is provided with a first protrusion, the lower mounting seat is provided with an opening corresponding to the first protrusion, the first protrusion cooperates with the opening to guide the upper mounting seat to slide in a direction adjacent the positive pole or negative pole of the battery cell.

14. The electronic cigarette according to claim 13, wherein the electrode contact comprises an upper contact and a lower contact, the first protrusion is provided with an electrode hole, the lower contact is provided with a contact hole, the lower contact is inserted into the electrode hole from the lower end of the upper mounting seat, the upper contact is inserted into the contact hole from the upper end of the upper mounting seat.

15. The electronic cigarette according to claim 10, wherein the housing comprises a first shell, a second shell and a connecting member, the connecting member is connected to the upper end of the first shell, the second shell is sleeved on the connecting member, the atomizer interface is disposed on the second shell.

16. The electronic cigarette according to claim 15, wherein a second protrusion is protruded on the inner wall of the second shell, the second protrusion is hollow to form an inner cavity extending through the opposite ends of the second protrusion, the inner cavity forms the atomization interface.

17. The electronic cigarette according to claim 16, wherein the upper end of the upper mounting seat is provided with a groove corresponding to the second protrusion, the second protrusion cooperates with the groove to guide the upper mounting seat to slide along the direction away from the positive or negative electrode of the battery cell.

18. The electronic cigarette according to claim 10, wherein the elastic member is a ring-shaped wave spring.

* * * * *